United States Patent
Kim et al.

(10) Patent No.: US 7,492,606 B2
(45) Date of Patent: Feb. 17, 2009

(54) PORTABLE GAME AND COMMUNICATION DEVICE

(75) Inventors: Jong-Woo Kim, Suwon-si (KR); Jung-Hee Jang, Daegu (KR); Young-Seok Yoon, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 877 days.

(21) Appl. No.: 10/945,205

(22) Filed: Sep. 20, 2004

(65) Prior Publication Data

US 2005/0113155 A1    May 26, 2005

(30) Foreign Application Priority Data

Nov. 25, 2003    (KR) ............... 10-2003-0084043

(51) Int. Cl.
*H05K 7/14* (2006.01)
(52) U.S. Cl. ...................... 361/797; 361/755
(58) Field of Classification Search ............... 361/797, 361/752, 800, 790; 455/332; 345/169
See application file for complete search history.

(56) References Cited

U.S. PATENT DOCUMENTS

| | | | | |
|---|---|---|---|---|
| 4,237,540 A | * | 12/1980 | Sato ..................... | 708/108 |
| 5,786,789 A | * | 7/1998 | Janky ..................... | 342/357.1 |
| D558,716 S | * | 1/2008 | Bae et al. ................. | D14/138 |
| 2002/0132640 A1 | | 9/2002 | Hyun et al. | |
| 2003/0073462 A1 | | 4/2003 | Zatloukal et al. | |
| 2005/0070348 A1 | * | 3/2005 | Lee et al. ................. | 455/575.4 |
| 2005/0221873 A1 | * | 10/2005 | Kameyama et al. ....... | 455/575.4 |
| 2006/0014575 A1 | * | 1/2006 | Tseng et al. ............ | 455/575.4 |
| 2007/0042817 A1 | * | 2/2007 | Lin ......................... | 455/575.1 |
| 2007/0153457 A1 | * | 7/2007 | Hosoya et al. ............. | 361/681 |
| 2007/0217132 A1 | * | 9/2007 | Collins ..................... | 361/681 |
| 2007/0243897 A1 | * | 10/2007 | Maatta et al. ............ | 455/550.1 |

FOREIGN PATENT DOCUMENTS

| | | |
|---|---|---|
| GB | 2 381 988 | 5/2003 |
| WO | WO 99/43134 | 8/1999 |
| WO | WO 01/99481 | 12/2001 |

\* cited by examiner

*Primary Examiner*—Hung S Bui
(74) *Attorney, Agent, or Firm*—The Farrell Law Firm, PC

(57) ABSTRACT

A portable game and digital communication device. The communication device comprises first and second side housings, which include a plurality of keys for video gaming controls. Additionally, the first and second side housings are rotatable about a central axis of the device, such the each of first and second side housings becomes a handle for the device.

18 Claims, 4 Drawing Sheets

PORTABLE GAME AND COMMUNICATION DEVICE

PRIORITY

This application claims priority to an application entitled "PORTABLE GAME/COMMUNICATION DEVICE WITH STICK FUNCTION", filed in the Korean Intellectual Property Office on Nov. 25, 2003 and assigned Serial No. 2003-84043, the contents of which are hereby incorporated by reference.

BACKGROUND OF THE INVENTION

1. Field of the Invention The present invention relates generally to a portable digital communication device including cellular phones, personal digital assistants, hand-held phones, and phones with game functions, and more particularly to a portable game and digital communication device including a control pad for playing games.

2. Description of the Related Art Generally, "portable communication devices" are devices that are portable and enable owners of the devices to communicate in a wirelessly. Such portable communication devices have become increasingly small, slim, graspable, and lightweight, whereby portability thereof is improved. Furthermore, such portable communication devices include multimedia functions. More specifically, future portable communication terminals will be miniaturized, lightweight, multipurpose terminals with various functions, which will be easily adapted to various multimedia and Internet environments.

The portable communication devices may be classified into several different types of communication devices based on their appearances. For example, portable communication devices may be classified into a bar-type communication device, a flip-type communication device, and a folder-type communication device. The bar-type communication device has a bar-type single housing, the flip-type communication device comprises a bar-type housing and a flip part pivotably attached to the housing, and the folder-type communication device comprises a bar-type housing and a folder part pivotably attached to the housing.

Additionally, the portable communication devices may also be classified into a necklace-type communication device and a wrist-type communication device according to where or how they are worn by a user. Obviously, the necklace-type communication device is worn on the neck of a user by means of a string, and the wrist-type communication device is worn on the wrist of the user.

Portable communication devices may be further classified according to how they are opened or closed, for example, into a rotating-type communication device and a sliding-type communication device. The rotating-type communication device is characterized in that two housings are rotatably connected to each other while the housings are continuously opposite to each other. The rotating-type communication device is opened or closed by the rotation of the two housings in such a manner that the housings are rotated apart from or close to each other. Alternatively, the sliding-type communication device is characterized in that two housings are longitudinally slid. The sliding-type communication device is opened or closed by the sliding movement of the two housings in such a manner that the housings are slid apart from or close to each other The portable communication devices have also been improved with the capability to transmit and receive data at high speeds. Consequently, the portable communication devices use wireless communication technology for transmitting data at high speed, which will satisfy the increasing desires of the consuming public.

It is another increasing trend that a camera lens is included in portable communication devices that transmit image signals. The portable communication device has a camera lens module mounted outside or inside the device so that a user of the device can talk with another user of the device while looking at each other, or take pictures of his/her desired subjects.

However, the conventional portable communication device has a problem in that a key operation is very inconvenient in a game mode. For example, the key operation is not usually performed very quickly and accurately, because keys used in the game mode are also used in a communication mode.

For example, the conventional portable communication device has a housing on which a plurality of keys are arranged. Consequently, distances between keys are small with the result that the key operation is not performed accurately. Also, the conventional portable communication device is used by only one hand of a user with the result that the key operation is not performed rapidly.

SUMMARY OF THE INVENTION

Therefore, the present invention has been designed in view of the above and other problems occurring in the prior art, and it is an object of the present invention to provide a portable game and digital communication device that enables a user to conveniently perform a key operation when a game requiring a control pad is played.

It is another object of the present invention to provide a portable digital communication device that enables a user to use one hand or both hands when a game is played, thereby accomplishing a rapid and accurate key operation.

In accordance with one aspect of the present invention, the above and other objects can be accomplished by a portable digital communication device comprising: a first housing having a first top surface and a second top surface stepped from the first top surface, the first housing being extended in the longitudinal direction of the device; a second housing having a first bottom surface and a second bottom surface stepped from the first bottom surface, the second housing being slid in the longitudinal direction of the device while being opposite to the first housing; a first side housing rotated about a first hinge axis while being opposite to one side surface of the first housing; and a second side housing rotated about a second hinge axis while being opposite to one side surface of the second housing, the second side housing being spaced apart from the first side housing while the second side housing is symmetrical to the first side housing.

In accordance with another aspect of the present invention, there is provided a portable digital communication device comprising: a first housing extended in the longitudinal direction of the device; a second housing slid in the longitudinal direction of the device while being opposite to the first housing; a first side housing extended in the direction perpendicular to the longitudinal direction of the first housing, the first side housing being rotated about a first hinge axis while being opposite to one side surface of the first housing, the first side housing being positioned uprightly in the shape of stick at one side of the first housing when the first side housing is rotated a prescribed angle; and a second side housing extended in the direction perpendicular to the longitudinal direction of the second housing, the second side housing being rotated about a second hinge axis while being opposite to one side surface of the second housing, the second side housing being spaced apart from the first side housing, the second side housing being positioned uprightly in the shape of a stick at one side of the second housing when the second side housing is rotated a prescribed angle.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
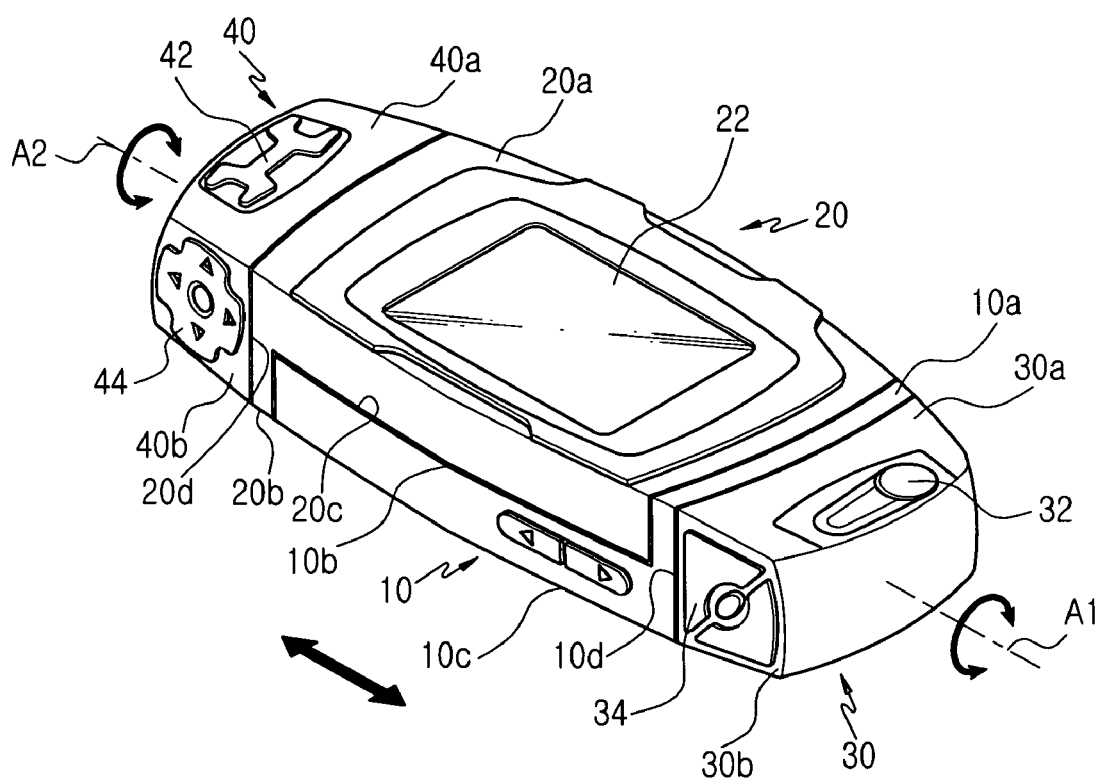
FIG. 1 is a perspective view illustrating a portable game/communication device according to a preferred embodiment of the present invention.
Figure 2:
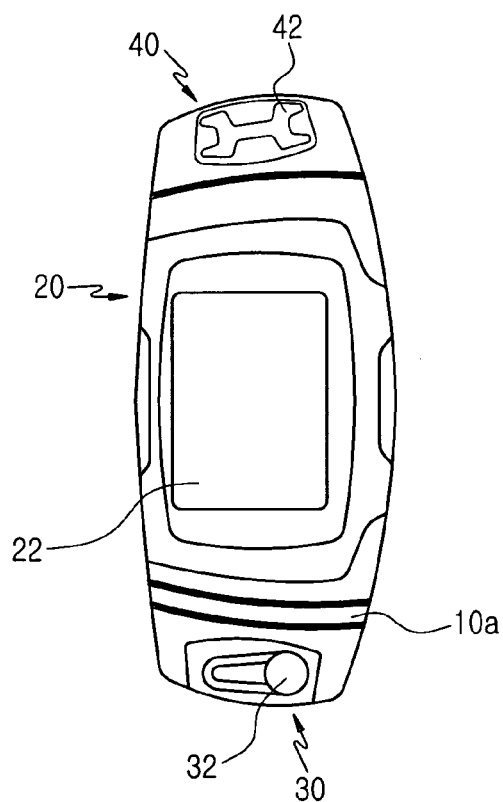
FIG. 2 is a plan view of the portable game/communication device illustrated in FIG. 1.

Preferred embodiments of the present invention will be described in detail herein below with reference to the accompanying drawings. In the following description, a detailed description of known functions and configurations incorporated herein will be omitted when it may obscure the subject matter of the present invention.

Accordingly, it should be noted that a portable digital communication device of the present invention is directed a device that enables a user to use both hands in a game mode, thereby accomplishing a rapid and accurate key operation.

As illustrated in FIGS. 1 to 6, a portable digital communication device according to the present invention comprises a first housing 10, which is extended in the longitudinal direction of the device, a second housing 20, which is slid in the longitudinal direction of the device while being opposite to the first housing 10, a first side housing 30, which is rotatable about a first hinge axis A1 while being located at a side surface 10d of the first housing 10, and a second side housing 40, which is rotated about a second hinge axis A2 and attached to a side surface 20d of the second housing 20.

Figure 4:
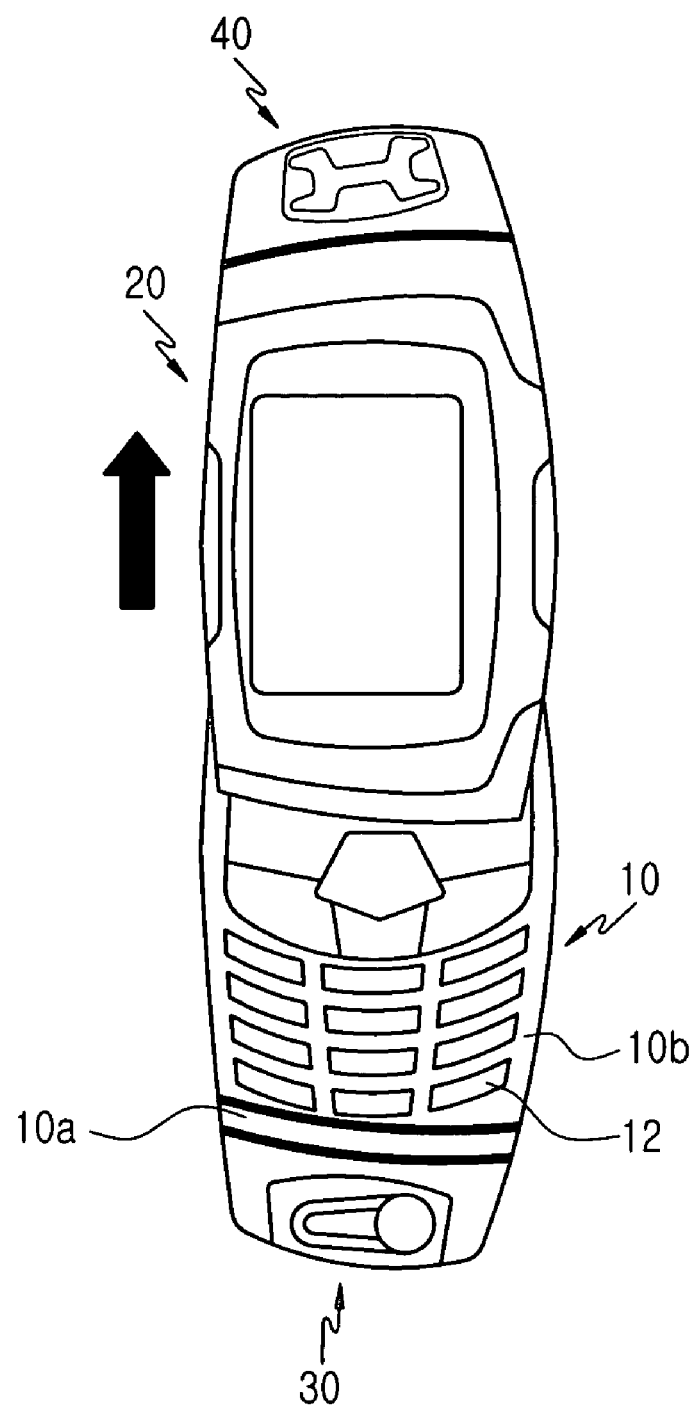
FIG. 4 is a plan view showing sliding movement of a second housing of the portable game/communication device illustrated in FIG. 1.

The first housing 10 includes a first top surface 10a, a second top surface stepped from the first top surface, and a bottom surface 10c. The first top surface 10a is adjacent to the first side housing 30, especially, to a top surface 30a of the first side housing 30. A first key array 12 comprising a plurality of keys is disposed on the second top surface 10b of the first housing 10. More specifically, the first key array 12 comprises keys related to communication. The first key array 12 is exposed to or hidden from the outside depending upon the sliding movement of the second housing 20. The keys of the first key array 12 are exposed to the outside as illustrated in FIG. 4.

Figure 3:
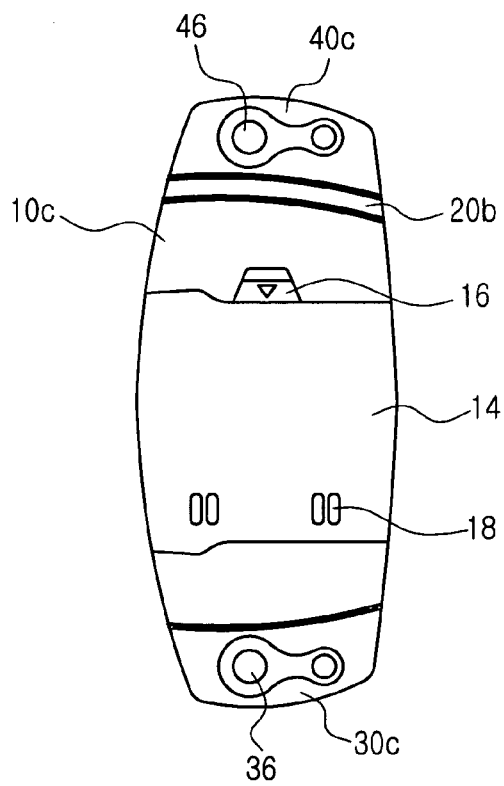
FIG. 3 is a bottom view of the portable game/communication device illustrated in FIG. 1.

A detachable a battery pack is attached to the bottom surface 10c of the first housing 10 is as illustrated in FIG. 3. The battery pack 14 is attached to or detached from the bottom surface 10c of the first housing 10 by means of a locking knob 16. Reference numeral 16 indicates a charging terminal.

The second housing 20 includes a top surface 20a, a first bottom surface 20b, and a second bottom surface 20c, which is stepped from the first bottom surface 20b. The first bottom surface 20b is arranged adjacent to the second side housing 40, especially, a bottom surface 40c of the second side housing 40. A display unit 22 is disposed on the top surface 20a of the second housing 20. The display unit 22 may be, for example, an LCD, a touch screen, or a holographic screen.

Preferably, the first and second housings 10 and 20 correspond to each other in terms of the shape, and the first and second side housings 30 and 40 are symmetrical to each other. The first and second side housings 30 and 40 are disposed at the sides of the first and second housings 10 and 20, respectively. The first and second housings 10 and 20 are slid relative to each other while the second top surface 10b of the first housing 10 is opposite to the second bottom surface 20c of the second housing 20.

When the second housing 20 is slid relative to the first housing 10, while the second housing 20 is opposite to the first housing 10, as illustrated in FIG. 4, the first key array 12 is gradually exposed to the outside, and the second housing 20 is moved away from the first housing 10. Consequently, a second key array 32 of the first side housing 30 is moved away from a fifth key array 42 of the second side housing 40.

Figure 5:
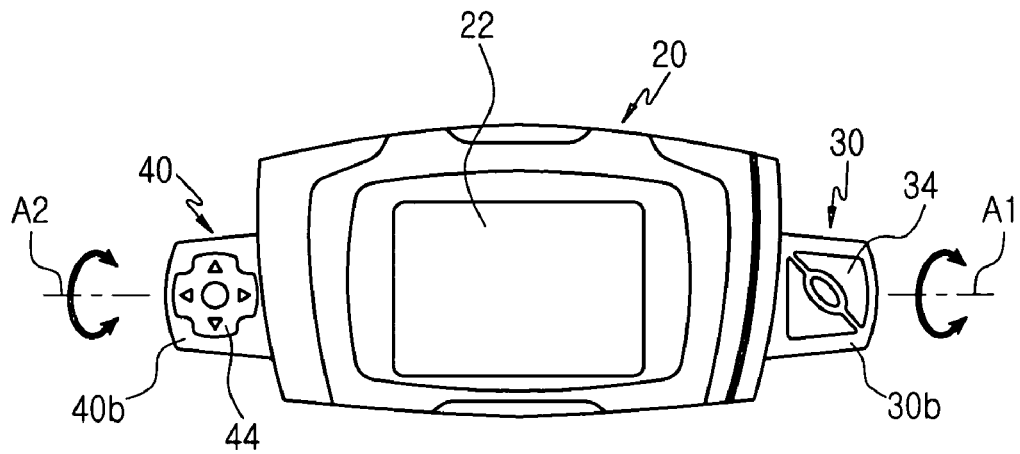
FIG. 5 is a plan view illustrating approximately 90 degrees rotations of first and second side housings of the portable game/communication device illustrated in FIG. 1.
Figure 6:
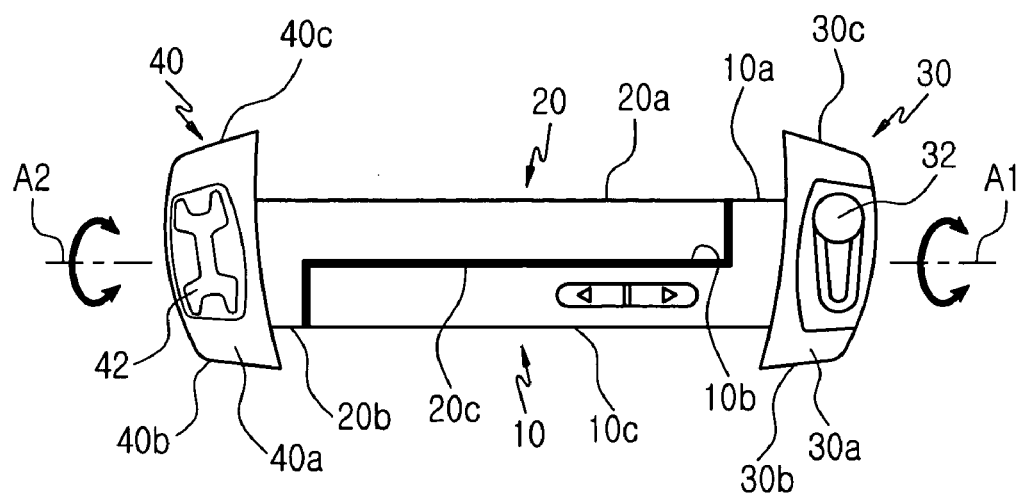
FIG. 6 is a side view of the portable game/communication device illustrated in FIG. 5.

As illustrated in FIGS. 5 and 6, the first and second side housings 30 and 40 are extended in a direction perpendicular to the longitudinal direction of the first and second housings 10 and 20, and are attached to the first and second housings 10 and 20, respectively, in such a manner that the first and second side housing 30 and 40 are rotated about the first and second hinge axes A1 and A2, respectively. When they are rotated approximately 90 degrees, the first and second side housings 30 and 40 are placed in an upright position, which means that each of the first and second side housings 30 and 40 is positioned as a handle.

The first side housing 30 includes a second key array 32 disposed on the top surface 30a thereof, a third key array 34 disposed on the side surface 30b thereof, and a fourth key array 36 disposed on the bottom surface 30c thereof. The second, third, and fourth key arrays 32, 34 and 36 comprise keys related to video gaming.

The second side housing 40 includes a fifth key array 42 disposed on the top surface 40a thereof, a sixth key array 44 disposed on the side surface 40b thereof, and a seventh key array 46 disposed on the bottom surface 40c thereof. The fifth, sixth, and seventh key arrays 42, 44 and 46 are also keys related to video gaming.

Preferably, the longitudinal direction of the first and second housings 10 and 20 is parallel to the sliding direction of the second housing 20, which is parallel to the axial direction of the first and second hinge axes A1 and A2. The first and second hinge axes A1 and A2 are coaxially arranged since the first and second housings 10 and 20 are symmetrical to each other, and the first and second side housings 30 and 40 are also symmetrical to each other.

FIGS. 5 and 6 illustrate the portable game and communication device in a game mode. As illustrated in FIGS. 5 and 6, first and second side housings 30 and 40 are rotated approximately 90 degrees. A user grasps the first and second side housings 30 and 40 with both hands, and then performs a key operation with his/her fingers to play a game. In the game mode, the second, third, and fourth key arrays 32, 34 and 36, and the fifth, sixth, and seventh key arrays 42, 44, and 46 are mainly used.

As is apparent from the above description, the present invention provides a portable game and communication device that enables a user to use both hands to play a video game, thereby accomplishing a rapid and accurate key operation, and improving convenience of game play.

Although the preferred embodiments of the present invention have been disclosed for illustrative purposes, those skilled in the art will appreciate that various modifications, additions, and substitutions are possible, without departing from the scope and spirit of the present invention as disclosed in the accompanying claims.

What is claimed is:

1. A portable digital communication device comprising:
   a first housing having a first top surface and a second top surface that is stepped from the first top surface, the first housing being extended in the longitudinal direction of the device;
   a second housing having a first bottom surface and a second bottom surface that is stepped from the first bottom surface, the second housing being slidable in the longitudinal direction of the device while being opposite to the first housing;
   a first side housing, which is rotatable about a first hinge axis and attached at a side surface of the first housing; and
   a second side housing, which is rotatable about a second hinge axis and attached at a side surface of the second housing,
   wherein the first and second side housings extend in a direction perpendicular to the longitudinal direction of the first and second housings, and wherein each of the first and second side housings is positioned as a handle when the first and second side housings are rotated from the first and second housings,
   wherein the first side housing includes a key array disposed on the top surface thereof, the key array including keys, and
   wherein the second side housing includes a key array disposed on the toy surface thereof the key array including keys.

2. The device as set forth in claim 1, wherein the first top surface of the first housing is adjacent to the first side housing.

3. The device as set forth in claim 1, wherein the first bottom surface of the second housing is adjacent to the second side housing.

4. The device as set forth in claim 1, wherein the second top surface of the first housing faces the second bottom surface of the second housing.

5. The device as set forth in claim 1, wherein the first housing is symmetrical to the second housing.

6. The device as set forth in claim 1, wherein the longitudinal direction of the first and second housings is parallel to a sliding direction of the second housing, and the sliding direction of the second housing is parallel to an axial direction of the first and second hinge axes.

7. The device as set forth in claim 1, wherein the first housing includes a first key array disposed on the second top surface thereof, the first key array including a plurality of keys related to communication.

8. The device as set forth in claim 1, wherein the second housing includes a display unit disposed on the first top surface thereof.

9. The device as set forth in claim 1, wherein the first side housing includes a second key array, which includes keys related to video gaming, disposed on the side surface thereof.

10. The device as set forth in claim 9, wherein the first side housing includes a third key array, which includes keys related to video gaming, disposed on the bottom surface thereof.

11. The device as set forth in claim 1, wherein the second side housing includes a second key array, which includes keys related to video gaming, disposed on the side surface thereof.

12. The device as set forth in claim 11, wherein the second side housing includes a third key array, which includes keys related to video gaming, disposed on the bottom surface thereof.

13. The device as set forth in claim 1, wherein the second side housing is symmetrical to the first side housing.

14. A portable digital communication device comprising:
    a housing extended in a longitudinal direction of the device;
    a first side housing extended in a direction perpendicular to the longitudinal direction of the housing, the first side housing being rotatable about a first hinge axis and attached at one side surface of the housing, wherein the first side housing is positioned as a handle at the side of the housing when the first side housing is rotated a prescribed angle; and
    a second side housing extended in a direction perpendicular to the longitudinal direction of the second housing, the second side housing being rotatable about a second hinge axis and attached at the other side surface of the housing, wherein the second side housing is positioned as a handle at the side of the housing when the second side housing is rotated a prescribed angle,
    wherein the first side housing includes a key array disposed on the top surface thereof, the key array including keys, and
    wherein the second side housing includes a key array disposed on the top surface thereof the key array including keys.

15. The device as set forth in claim 14, wherein the first side housing includes a second key array, which includes keys related to video gaming, disposed on the side surface thereof.

16. The device as set forth in claim 15, wherein the first side housing includes a third key array, which includes keys related to video gaming, disposed on the bottom surface thereof.

17. The device as set forth in claim 14, wherein the second side housing includes a second key array, which includes keys related to video gaming, disposed on the side surface thereof.

18. The device as set forth in claim 17, wherein the second side housing includes a third key array, which includes keys related to video gaming, disposed on the bottom surface thereof.

* * * * *